(12) United States Patent
Yu et al.

(10) Patent No.: US 9,936,376 B2
(45) Date of Patent: Apr. 3, 2018

(54) ADAPTIVE D2D DISCOVERY OPERATIONS

(71) Applicant: Nokia Technologies Oy, Espoo (FI)

(72) Inventors: Ling Yu, Espoo (FI); Yixue Lei, Beijing (CN); Zexian Li, Espoo (FI); Kodo Shu, Shanghai (CN); Vinh Van Phan, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/303,098

(22) PCT Filed: Apr. 11, 2014

(86) PCT No.: PCT/IB2014/060656
§ 371 (c)(1),
(2) Date: Oct. 10, 2016

(87) PCT Pub. No.: WO2015/155573
PCT Pub. Date: Oct. 15, 2015

(65) Prior Publication Data
US 2017/0034687 A1    Feb. 2, 2017

(51) Int. Cl.
*H04B 7/00*    (2006.01)
*H04W 8/00*    (2009.01)
(Continued)

(52) U.S. Cl.
CPC .......... *H04W 8/005* (2013.01); *H04W 72/04* (2013.01); *H04W 76/023* (2013.01)

(58) Field of Classification Search
CPC .... H04W 72/04; H04W 76/023; H04W 8/005
See application file for complete search history.

(56) References Cited

U.S. PATENT DOCUMENTS

2012/0106517 A1    5/2012  Charbit et al.
2013/0064138 A1*   3/2013  Hakola .................. H04L 67/16
                                                      370/255
(Continued)

OTHER PUBLICATIONS

International Search Report and Written Opinion received for corresponding Patent Cooperation Treaty Application No. PCT/IB2014/060656, dated Dec. 8, 2014, 11 pages.

(Continued)

*Primary Examiner* — Xin Jia
(74) *Attorney, Agent, or Firm* — Mintz Levin Cohn Ferris Glovsky and Popeo, P.C.

(57) ABSTRACT

First and second level discovery messages for device-to-device discovery are determined to be going to be transmitted, resource(s) are requested for transmission of at least the second level discovery message, and allocated resource(s) of a second type are received. The first level discovery message is transmitted on either a selected resource of the first type or a selected one of the allocated resource(s). The second level discovery message is transmitted on a selected one of the more allocated resource(s) of the second type, A first level discovery message is received on a resource of either a first type or a second type. It is determined whether the received message is of interest or not and if the message is of interest, then it is determined whether a second level discovery message is available and if so, the second level discovery message is received on a resource of the second type.

14 Claims, 7 Drawing Sheets

(51) Int. Cl.
*H04W 72/04*     (2009.01)
*H04W 76/02*     (2009.01)

(56) References Cited

U.S. PATENT DOCUMENTS

| | | |
|---|---|---|
| 2014/0094212 A1 | 4/2014 | Ahn |
| 2015/0215846 A1* | 7/2015 | Wang ................ H04W 72/0446 370/336 |
| 2017/0034834 A1* | 2/2017 | Folke ................ H04W 72/082 |

OTHER PUBLICATIONS

3rd Generation Partnership Project; Technical Specification Group Radio Access Network; Study on LTE Device to Device Proximity Services; Radio Aspects (Release 12), 3GPP Standard; 3GPP TR 36.843, 3rd Generation Partnership Project (3GPP), vol. RAN WG1, No. V12.0.1, Mar. 27, 2014, pp. 1-50, XP050770026.

Nokia et al., "Resource Allocation for Discovery Signals" 3GPP Draft; R1-140575, 3rd Generation Partnership Project (3GPP), vol. RAN WG1, No. Prague, Czech Republic; 20140210-20140214 Feb. 9, 2014; XP050736102.

3GPP, "Technical Specification Group Services and System Aspects; Feasibility study for Proximity Services (ProSe) (Release12)," 3rd Generation Partnership Project, 3GPP TR 22.803 V12.2.0, Jun. 2013.

* cited by examiner

ADAPTIVE D2D DISCOVERY OPERATIONS

RELATED APPLICATION

This application was originally filed as Patent Cooperation Treaty Application No. PCT/IB2014/060656 filed Apr. 11, 2014.

TECHNICAL FIELD

This invention relates generally to wireless communications and, more specifically, to device-to-device (D2D) communications.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below at the end of the specification but prior to the claims.

Device-to-device (D2D) communications allow wireless devices, typically referred to as UEs, to communicate with each other directly. In D2D communications, UEs transmit data signals to each other over a direct link using cellular resources instead of having to communicate through a base station (such as an eNB). Typically, D2D users communicate directly while the base station retains control of the UEs and their communications.

There is a feasibility study on Proximity-based Services (ProSe) for D2D, which has identified services that could be provided by a 3GPP system based on UEs being in proximity to each other. See, e.g., 3GPP TR 22.803 V12.2.0 (2013-06). The objective is to study use cases and identify potential requirements for operator network controlled discovery and communications between UEs that are in proximity, under continuous network control, and under 3GPP network coverage. The identified areas include services related to commercial services and public safety that would be of interest to operators and users.

An additional feasibility study has objectives such as to evaluate LTE device-to-device proximity services, both within and outside network coverage. For instance, within network coverage, discovery could be performed for non-public safety and public safety requirements, and direct communication could be performed at least for public safety requirements. See, e.g., 3GPP TR 36.843 V0.3.1 (2013-11).

Various options have been discussed for performing discovery and the corresponding direct communication that follows discovery for D2D. However, the current options for discovery may be improved.

SUMMARY

This section contains examples of possible implementations and is not meant to be limiting.

In an exemplary embodiment, a method includes: determining first and second level discovery messages for device-to-device discovery are to be transmitted; requesting one or more resources for transmission of at least the second level discovery message and receiving one or more allocated resources of a second type; transmitting the first level discovery message on either a selected resource from a preconfigured resource pool of the first type or a selected one of the one or more allocated resources of the second type; and transmitting the second level discovery message on a selected one of the one or more allocated resources of the second type.

An exemplary apparatus includes one or more processors and one or more memories including computer program code. The one or more memories and the computer program code are configured to, with the one or more processors, cause the apparatus to perform at least the following: determining first and second level discovery messages for device-to-device discovery are to be transmitted; requesting one or more resources for transmission of at least the second level discovery message and receiving one or more allocated resources of a second type; transmitting the first level discovery message on either a selected resource from a preconfigured resource pool of the first type or a selected one of the one or more allocated resources of the second type; and transmitting the second level discovery message on a selected one of the one or more allocated resources of the second type.

An exemplary computer program product includes a computer-readable storage medium bearing computer program code embodied therein for use with a computer. The computer program code includes: code for determining first and second level discovery messages for device-to-device discovery are to be transmitted; code for requesting one or more resources for transmission of at least the second level discovery message and receiving one or more allocated resources of a second type; code for transmitting the first level discovery message on either a selected resource from a preconfigured resource pool of the first type or a selected one of the one or more allocated resources of the second type; and code for transmitting the second level discovery message on a selected one of the one or more allocated resources of the second type.

An apparatus includes: means for determining first and second level discovery messages for device-to-device discovery are to be transmitted; means for requesting one or more resources for transmission of at least the second level discovery message and receiving one or more allocated resources of a second type; means for transmitting the first level discovery message on either a selected resource from a preconfigured resource pool of the first type or a selected one of the one or more allocated resources of the second type; and means for transmitting the second level discovery message on a selected one of the one or more allocated resources of the second type.

In a further exemplary embodiment, a method includes: receiving a first level discovery message for device-to-device communications on either a resource of a first type or a resource of a second type; determining whether the received first level discovery message is of interest or not and in response to the first level discovery message being of interest, then determining whether a second level discovery message corresponding to the first level discovery message is available and receiving, in response to a determination the second level discovery message is available, the second level discovery message on a resource of the second type.

An exemplary apparatus includes one or more processors and one or more memories including computer program code. The one or more memories and the computer program code are configured to, with the one or more processors, cause the apparatus to perform at least the following: receiving a first level discovery message for device-todevice communications on either a resource of a first type or a resource of a second type; determining whether the received first level discovery message is of interest or not and in response to the first level discovery message being of interest, then determining whether a second level discovery message corresponding to the first level discovery message is available and receiving, in response to a determination the second level discovery message is available, the second level discovery message on a resource of the second type.

An exemplary computer program product includes a computer-readable storage medium bearing computer program code embodied therein for use with a computer. The computer program code includes: code for receiving a first level discovery message for device-to-device communications on either a resource of a first type or a resource of a second type; code for determining whether the received first level discovery message is of interest or not and in response to the first level discovery message being of interest, then performing code for determining whether a second level discovery message corresponding to the first level discovery message is available and code for receiving, in response to a determination the second level discovery message is available, the second level discovery message on a resource of the second type.

In another exemplary embodiment, an apparatus includes: means for receiving a first level discovery message for device-to-device communications on either a resource of a first type or a resource of a second type; and means for determining whether the received first level discovery message is of interest or not and in response to the first level discovery message being of interest, then using means for determining whether a second level discovery message corresponding to the first level discovery message is available and means for receiving, in response to a determination the second level discovery message is available, the second level discovery message on a resource of the second type.

The apparatus described above and herein may be part of a system. The system may further comprise a base station, wherein the base station allocates at least one or more resources of the second type for use by the two apparatus for device-to-device discovery and communicates indication of the allocated one or more resources to at least one of the apparatus.

A computer program comprises program code for executing the method as described above and herein. The computer program according to this paragraph, wherein the computer program is a computer program product comprising a computer-readable medium bearing computer program code embodied therein for use with a computer.

BRIEF DESCRIPTION OF THE DRAWINGS

In the attached Drawing Figures:

FIG. 4, including FIG. 5, including

DETAILED DESCRIPTION OF THE DRAWINGS

Figure 1:
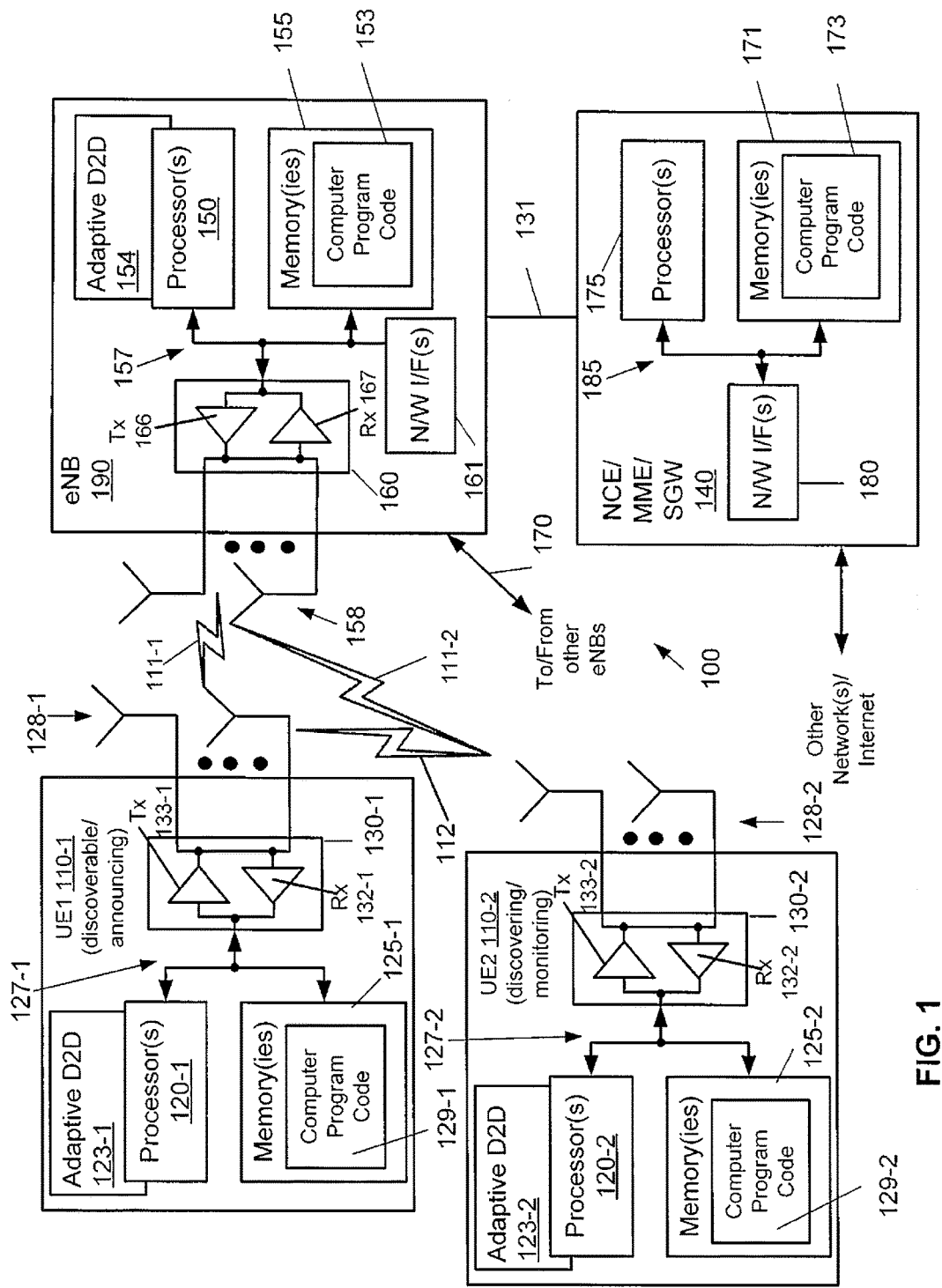
FIG. 1 illustrates an exemplary system suitable for practicing exemplary embodiments herein.

Before proceeding with additional description of possible problems with conventional techniques, reference is made to FIG. 1, which shows a block diagram of an exemplary system in which the exemplary embodiments may be practiced. In FIG. 1, UE1 110-1 and UE2 110-2 are in wireless communication with a network 100. In the examples that follow, there is a "discovering" UE, which is mainly referred to as UE2 110-2 herein. The discovering UE 110-2 is the UE that is discovering (e.g., monitoring) other UEs in order to discover other UEs in proximity. There is also a "discoverable" UE, which is mainly referred to as UE1 110-1 herein. The discoverable UE 110-1 is an announcing (e.g., transmitting) UE in order to allow other UEs in proximity to discover the discoverable UE. This terminology is from 3GPP, e.g., 3GPP TR 22.803. For clarity, the discovering UE may also be referred to below as a monitoring UE and the discoverable UE may also be referred to below as an announcing UE, as also indicated in FIG. 1.

Collectively, the two UEs are referred to as UEs 110 and individually each UE is referred to as a UE 110 or specifically a UE 110-1 or 110-2. Similarly, the elements in each UE 110 have a "-1" to associate the elements with UE 110-1 or a "-2" to associate the elements with UE 110-2. Generically and for ease of reference, the "-1" and "-2" is dropped herein, e.g., when reference is made to an element in a UE 110 that is not necessarily specific to an element in a certain UE. For instance, each user equipment 110 includes one or more processors 120, one or more memories 125, and one or more transceivers 130 (each comprising a receiver, Rx, 132, and a transmitter, Tx, 133) interconnected through one or more buses 127. The one or more transceivers 130 are connected to one or more antennas 128. The one or more memories 125 include computer program code 129. In an exemplary embodiment, the one or more memories 125 and the computer program code 129 are configured, with the one or more processors 120, to cause the user equipment 110 to perform one or more of the operations as described herein. For instance, an adaptive D2D module 123 performs adaptive D2D discovery operations as described herein and could be implemented in part or completely in computer program code 129 that is loaded into the one or more processors 120. As another example, the adaptive D2D module 123 could be implemented as hardware logic, e.g., in a processor or other hardware element such as a processor 120 that performs the adaptive D2D discovery operations as described herein. Furthermore, a combination of hardware and software elements, e.g., the software elements implemented in the computer program code 129 by the one or more processors 120, may be used. Each UE 110 communicates with eNB 190 via a corresponding wireless link 111-1 or 111-2. Additionally, the UEs 110-1 and 110-2 may perform D2D discovery operations and corresponding communications via wireless link 112.

The eNB 190 includes one or more processors 150, one or more memories 155, one or more network interfaces (N/W I/F(s)) 161, and one or more transceivers 160 (each comprising a receiver, Rx, 167 and a transmitter, Tx, 166) interconnected through one or more buses 157. The one or more transceivers 160 are connected to one or more antennas 158. The one or more memories 155 include computer program code 153. The adaptive D2D module 154 performs adaptive D2D discovery operations as described herein and could be implemented in part or completely in computer program code 153 that is loaded into the one or more processors 150. Thus, in an exemplary embodiment, the one or more memories 155 and the computer program code 153 are configured to, with the one or more processors 150, cause the eNB 190 to perform one or more of the operations as described herein. As another example, the adaptive D2D module 154 could be implemented as hardware logic, e.g., in a processor or other hardware element such as a processor 150 that performs the adaptive D2D discovery operations as described herein. Furthermore, the combination of hardware and software elements, the software elements implemented by the one or more processors 150, may be used.

The one or more network interfaces 161 communicate over one or more networks such as the networks 170 and 131. Two or more eNBs 190 communicate using, e.g., network 170. The network 170 may be wired or wireless or both and may implement, e.g., an X2 interface.

The wireless network 100 may include a network control element (NCE) 140 that may include MME/SGW functionality, and which provides connectivity with a further network, such as a telephone network and/or a data communications network (e.g., the Internet). The eNB 190 is coupled via a network 131 to the NCE 140. The network 131 may be implemented as, e.g., an S1 interface. The NCE 140 includes one or more processors 175, one or more memories 171, and one or more network interfaces (N/W I/F(s)) 180, interconnected through one or more buses 185. The one or more memories 171 include computer program code 173.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 150, and 175 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments of the user equipment 110 can include, but are not limited to, meter devices, cellular telephones such as smart phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

The eNB 190 may be any base station (which allows wireless devices to connect to a network). Additionally, although cellular is used herein as an example, other wireless technologies such as Wi-Fi may be used.

The exemplary embodiments herein are related to Proximity Services (ProSe) and D2D communications which have been studied in 3GPP for possible standardization in future releases (Rel-12/13 and beyond). In particular, this invention is related to D2D discovery for in-network coverage scenario, which is the focus in RAN2 (RAN WG2). The RAN WG2 is in charge of the radio interface architecture and protocols, the specification of the radio resource control protocol, the strategies of radio resource management and the services provided by the physical layer to the upper layers.

Concerning potential problems with conventional techniques for D2D discovery, according to 3GPP TR 36.843, two types of D2D discovery are defined (see section 8.1 of 3GPP TR 36.843 V0.3.1 (2013-11)):

Type 1: a discovery procedure where resources for discovery signal transmission are allocated on a non-UE-specific basis Note: Resources can be for all UEs or group of UEs Type 2: a discovery procedure where resources for discovery signal transmission are allocated on a per-UE-specific basis Type 2A: Resources are allocated for each specific transmission instance of discovery signals Type 2B: Resources are semi-persistently allocated for discovery signal transmission Type 1 discovery is simple scheme with less control and signaling overhead as the resource pool for discovery signal transmission is allocated on a non-UE-specific basis with common control signaling and each UE selects one of multiple discovery resources from the discovery resource pool. However, collision may happen on type 1 discovery resources if two or more UEs select the same discovery resource for D2D discovery message transmission, which may impact the latency and reliability of D2D discovery.

Type 2 discovery may provide certain benefits to support D2D discovery use cases with more reliability requirement (e.g. for public safety) and/or higher priority. See R2-134287, "Type 2B resource allocation for D2D discovery", 3GPP TSG-RAN2 Meeting #84, San Francisco, USA, Nov. 11-15, 2013. However, signaling overhead is one concern of type 2 discovery. Intel in R2-134287 points out that signaling overhead for type 2 discovery may not be significant if a UE is in RRC connected mode for normal LTE services or network assistance for D2D discovery. There is another issue for type 2 discovery, from an eNB's control and resource utilization point of view, when the eNB 190 needs to advertise a type 2 resource pool as well as facilitating UEs 110 that are performing D2D discovery to find suitable resources to monitor. If a type 2 resource pool is determined by eNB dynamically based on a need for type 2 discovery, the frequent update on the type 2 resource pool may introduce additional control and signaling overhead. On the other hand, if a type 2 resource pool is pre-configured and reserved by the eNB in a semi-static way, and therefore the update of type 2 resource pool is not needed that often, the semi-static resource needs to be dimensioned to support a relative large number of D2D UEs. Therefore, the semi-static resource may not be fully utilized if the number of D2D UEs who need type 2 discovery in the cell is low. An example of a semi-static reservation is that the reservation is for some set time period that is known, and might change at the end of a time period and before a new period starts. Another option could be that the eNB is configured by, e.g., OAM (operations, administration, and maintenance) type 2 resource pool, the update is only possible with reconfiguration by OAM. Yet other examples are possible.

D2D discovery transmissions may support only a limited number of discovery information bits, e.g., such as a message of about 100 bits plus sequences. It is foreseeable that UE IDs, application related information (e.g., application ID, service ID, QoS, and the like), UE status or capability-related information (e.g., power status, mobility status, discovery range class, relay capability, D2D control capability, and the like) are the potential candidates for a D2D discovery message. In addition, a D2D UE 110 may also put some additional information (e.g., for commercial purposes to put some general advertising information) into a D2D discovery message in order to fully exploit D2D discovery services from a user service's point of view. With a limited discovery message size (e.g., about 100 bits), it may not be feasible to put everything into one discovery message. If a discoverable UE 110 is allowed to transmit higher layer D2D discovery messages over multiple physical layer discovery messages on either pre-defined type 1 or type 2 resources, the UE 110 will either cause more collisions on type 1 resources or make type 2 resource management more difficult, as larger variation will be needed for type 2 resources (e.g., due to the discoverable UE taking more resources and thus there will be fewer resources for use by other discoverable UEs unless type 2 resources are more varied). Therefore, an exemplary focus of certain exemplary embodiments herein is the problem of how to perform multiple discovery message transmissions in a smart and adaptive way to allow certain D2D UEs to put more information into D2D discovery messages.

In exemplary embodiments herein, adaptive LTE discovery operations are proposed for D2D discovery resource utilization, discovery message structure and corresponding transmission mechanisms, which provides more flexible D2D discovery with less network control and signaling overhead as compared to current techniques. Detailed proposals herein include but are not limited to the following non-limiting examples.

1) A discoverable UE, based on a need for D2D discovery and available D2D discovery resources, determines a technique for using D2D discovery resources to transmit D2D discovery message(s): a) using only type 1 or type 2 resources to transmit a single D2D discovery message, or b) using both type 1 and type 2 resources or multiple type 2 resources to transmit multiple messages, e.g., with cooperated transmission of hierarchical D2D discovery messages as proposed below. For instance, if the discoverable UE 110 sees that the intended discovery message cannot fit into one discovery message that is pre-defined for a discovery message transmission on a type 1 or type 2 resource or sees that a type 1 resource is not sufficient to serve the intended discovery service (e.g., based on a detected collision rate of discovery messages on the type 1 resource being greater than a threshold), the discoverable UE may determine to use the technique (b) presented above. In this case, the discoverable UE 110 may request from the eNB additional type 2 resource(s) indicating existing used or allocated type 1 or type 2 resources if any and also, e.g., a cause of requesting additional resource(s) so that the eNB 190 can make a decision as to whether additional discovery resource(s) can be allocated or not.

2) If a requested additional discovery resource is allocated, the discoverable UE 110 will adapt the discovery message based on an updated discovery resource allocation using a hierarchical D2D discovery message structure in which the following occurs.

a) A first-level discovery message may include only filter and resource allocation information to facilitate discovering UEs to identify a discoverable UE of interest and radio resources for a further discovery message.

i) Herein the filter information may be, e.g., a group ID indicating a D2D discovery group to which the discoverable UE belongs, or an application ID indicating D2D enabled application that the discoverable UE is using, or a service ID indicating a D2D based service that discoverable UE can provide, or even a UE ID identifying the discoverable UE, and the like.

ii) The resource allocation information indicates dedicated radio resources over which a second level discovery message from the same discoverable UE will be transmitted.

b) A second level discovery message may include any further information of the interested application and/or services that can facilitate the discovering UE 110 to identify and discover the discoverable UEs 110. The second level discovery message in this case is more flexible in terms of discovery message size and content, as a dedicated resource for the second level discovery message is allocated to the discoverable UE, and the resource is indicated to the discovering UE by the discoverable UE, but not by the eNB with common control signaling.

3) The hierarchical D2D discovery messages are transmitted in cooperative way, in which the following occurs:

a) A first level discovery message (e.g., possibly with fixed size) is transmitted in a type 1 or type 2 resource pool provided by the eNB using common control signaling.

b) A second level discovery message is transmitted on a type 2 resource that is allocated by eNB dynamically to the discoverable LTE. Herein the allocated dedicated resource can be from a type 2 resource pool that is advertised or indicated by the eNB 190 or from a "hidden" type 2 resource that is not indicated to all D2D enabled UEs in the cell by eNB with common control signaling. Herein "hidden" means only the eNB 190 knows the pool and the eNB 190 allocates specific and dedicated resource(s) from the pool to each discoverable UE. The discovering UE 110-2 can, based on the indication from discoverable UE, determine where to find the second level discovery message from the discoverable UE 110-1.

Figure 2:
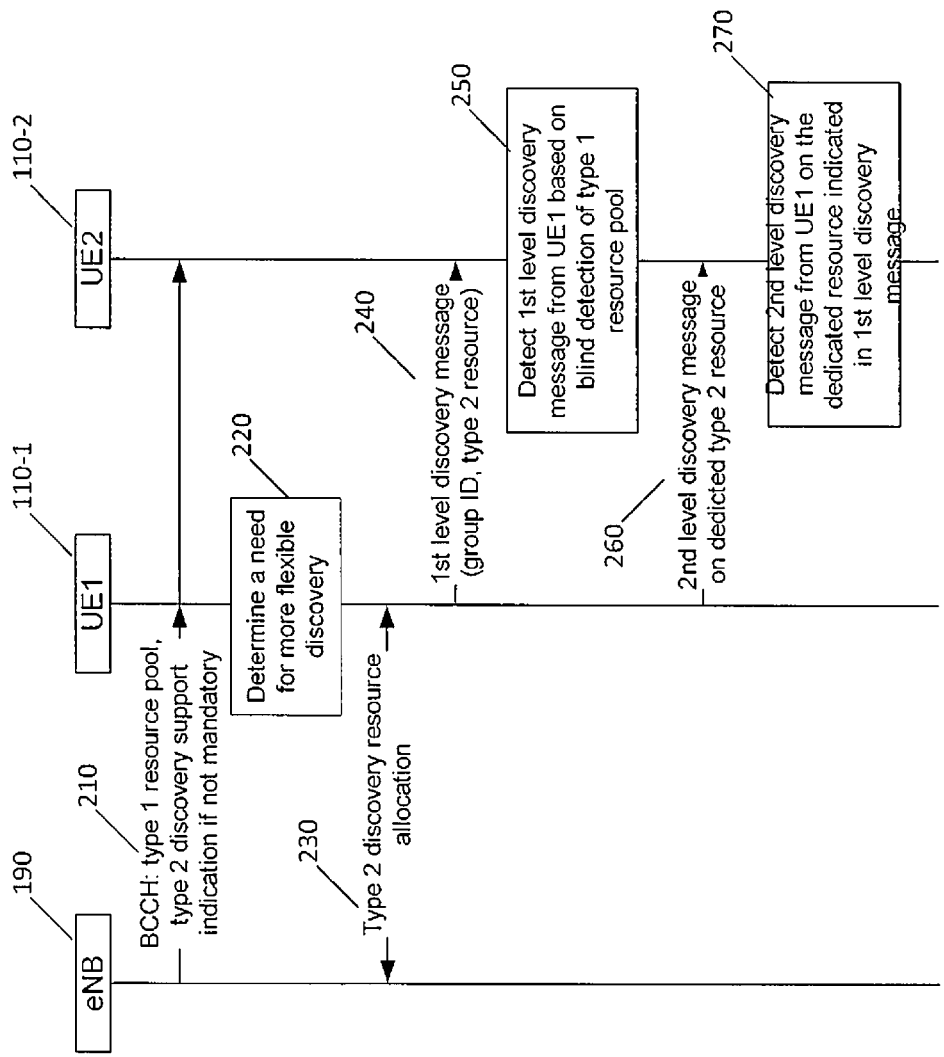
FIG. 2 is a signaling diagram illustrating cooperative transmission of a hierarchical D2D discovery message, in accordance with an exemplary embodiment.

One implementation example is illustrated in FIG. 2, in which it is assumed the eNB 190 broadcasts (reference 210) (on BCCH in this example) a type 1 resource pool and indication of support of type 2 discovery. Note that it may be mandatory for the eNB 190 to support of type 2 discovery. If it is not mandatory (the "if not mandatory" in block 210), then the eNB should broadcast an indication to indicate support of type 2 discovery or not. The UE1 110-1, based on a need for D2D discovery, determines the limited type 1 discovery message content cannot serve the intended D2D discovery service, therefore the UE1 110-1 determines (block 220) a need for more flexible discovery (e.g., than that supported by the offered resources by the eNB 190). Consequently, the UE1 110-1 requests (and receives an indication of) dedicated type 2 discovery resource(s) (as part of reference 230, which is a type 2 discovery resource allocation procedure). Upon type 2 discovery resource allocation (reference 230), UE1 110-1 may adapt D2D discovery message transmission such that a first (1st) level discovery message 240 is transmitted within a type 1 resource pool and includes for example D2D group ID ("group ID") and dedicated type 2 resource information ("dedicated type 2 resource") for a second (2nd) level discovery message 260.

Herein, group ID is only used as an example, as other information to facilitate discovering UEs (e.g., UE2 110-2) to filter out unwanted discovery can be included here. In this way, in case the discovered UE (e.g., UE1 110-1, which is discovered by UE2 110-2) is not of interest, there is no need for the discovering UE (e.g., UE2 110-2) to decode the second level of discovery message and hence unnecessary power consumption can be avoided. For dedicated type 2 resources information in the first level discovery message 240, this information can be some index if type 2 resources are pre-defined (e.g., either hard-coded in standardization or type 2 resource pool is also advertised or broadcasted by eNB in a pre-defined format) or the information can be pre-defined resource assignment bits in both frequency and time domain (e.g., in frequency domain in a similar way of resource block assignment bits of DCI in PDCCH and in time domain with format of SFN and subframe number(s)).

UE2 110-2, which is interested in D2D discovery, may scan the type 1 resource pool in order to find a D2D discovery message 240 from other UEs. Upon detecting (block 250) the first level discovery message from UE1 110-1, the UE2 110-2 determines based on group ID and/or other criteria that the UE1 110-1 is from the same or interested D2D group and may be of interest for UE2 110-2 to be discovered. Then, UE2 110-2 may try to detect (block 270) the second level discovery message 270 from the UE1 110-1 on the dedicated resources indicated in the first level discovery message.

Though the exemplary implementation in the example of FIG. 2 uses a type 1 resource pool for the first level discovery message 240 transmission, the semi-static type 2 resource pool can also be used for the first level discovery message 240, providing that the semi-static type 2 resource pool is advertised or broadcasted by the eNB 190 so that UE2 110-2 will also blindly search the type 2 resource pool in order to find the first level discovery message 240 from the UE1 110-1.

Figure 3:
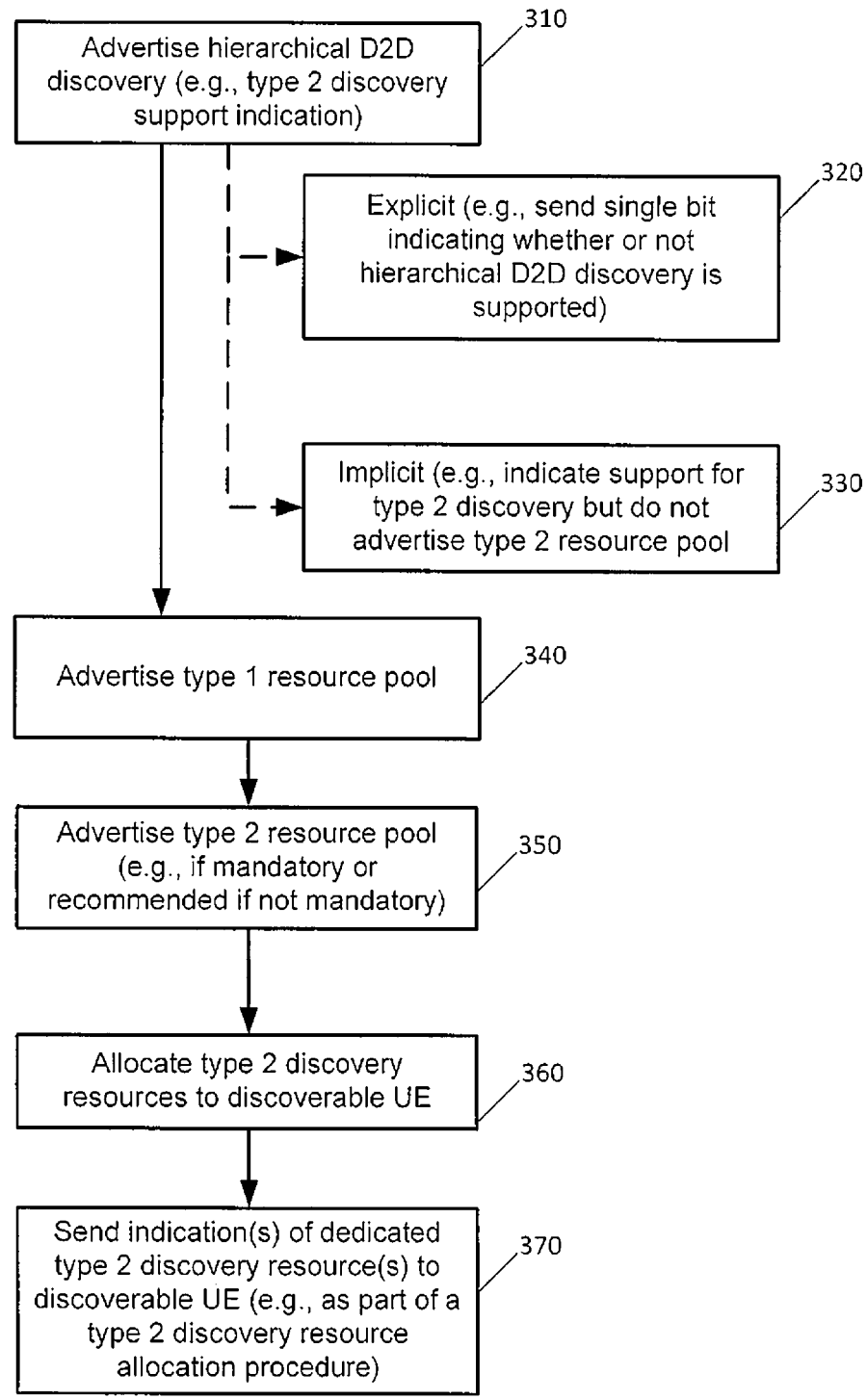
FIG. 3 is a block diagram of an exemplary logic flow diagram performed by a base station for adaptive D2D discovery operation, and that illustrates the operation of an exemplary method, a result of execution of computer program instructions embodied on a computer readable memory, and/or functions performed by logic implemented in hardware, in accordance with exemplary embodiments herein.

Turning to FIG. 3, a block diagram is shown of an exemplary logic flow diagram performed by a base station for adaptive D2D discovery operation. FIG. 3 further illustrates the operation of an exemplary method, a result of execution of computer program instructions embodied on a computer readable memory, and/or functions performed by logic implemented in hardware, in accordance with exemplary embodiments herein. The blocks in FIG. 3 may be considered to be interconnected means for performing the functions in the blocks. The blocks in FIG. 3 are performed by eNB 190, e.g., under control of the adaptive D2D module 154.

In block 310, the eNB 190 advertises hierarchical D2D discovery. Such advertisement may include the type 2 discovery support indication shown in FIG. 2 in reference 210. Such advertisement may also be explicit (block 320) such as by the eNB sending a single bit (e.g., the type 2 discovery support indication) indicating whether or not hierarchical D2D discovery is supported. Such advertisement may be implicit (block 330), such as by the eNB 190 indicating support for type 2 discovery but the eNB does not advertise a type 2 resource pool. A discoverable UE 110-1 that receives the indicated support for type 2 discovery but not a type 2 resource pool would therefore determine the eNB supports hierarchical D2D discovery.

In block 340, the eNB 190 advertises the type 1 resource pool to the discoverable UE 110-1 and to the discovering UE 110-2. Optionally, the eNB 190 may also advertise (block 350) the type 2 resource pool (e.g., so the UE 110-2 can perform blind decoding of messages using resources in the type 2 resource pool) along with the advertisement of the type 1 resource pool. In FIG. 2, block 340 is performed in reference 210. Additionally, advertisement of the type 2 resource pool (block 350) may also be performed in reference 210.

In block 350, the eNB 190 may also advertise the type 2 resource pool (e.g., if mandatory or recommended if not mandatory) and also allocate (block 360) the type 2 discovery resources to the discoverable UE. In block 370, the eNB 190 sends indication(s) of dedicated type 2 discovery resource(s) to discoverable UE (e.g., as part of a type 2 discovery resource allocation procedure). In the example of FIG. 2, blocks 350, 360, and 370 are performed as part of reference 230, which is a type 2 discovery resource allocation procedure.

Figure 4A:
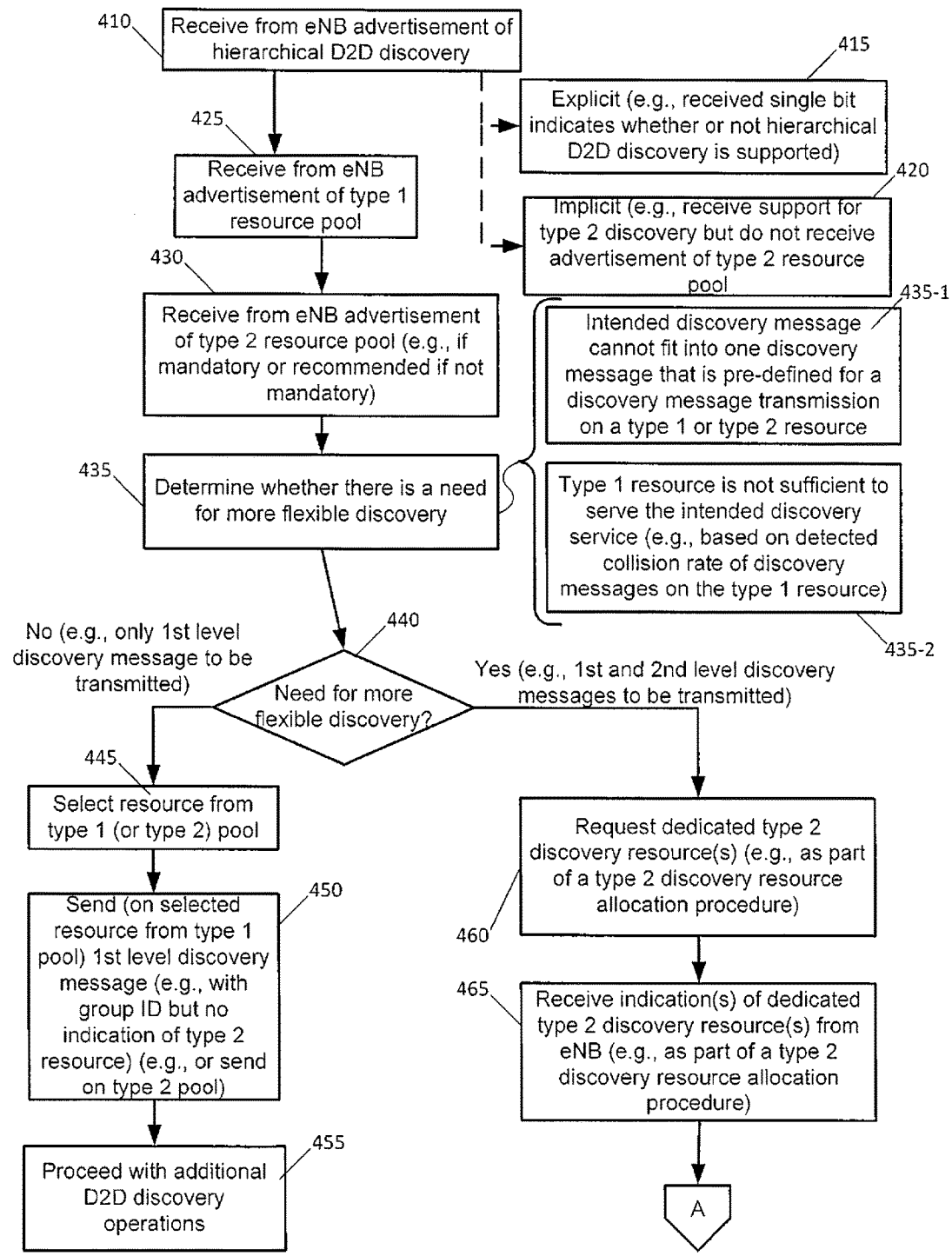
FIGS. 4A and 4B, is a block diagram of an exemplary logic flow diagram performed by a discoverable user equipment for adaptive D2D discovery operation, and that illustrates the operation of an exemplary method, a result of execution of computer program instructions embodied on a computer readable memory, and/or functions performed by logic implemented in hardware, in accordance with exemplary embodiments herein.
Figure 4B:
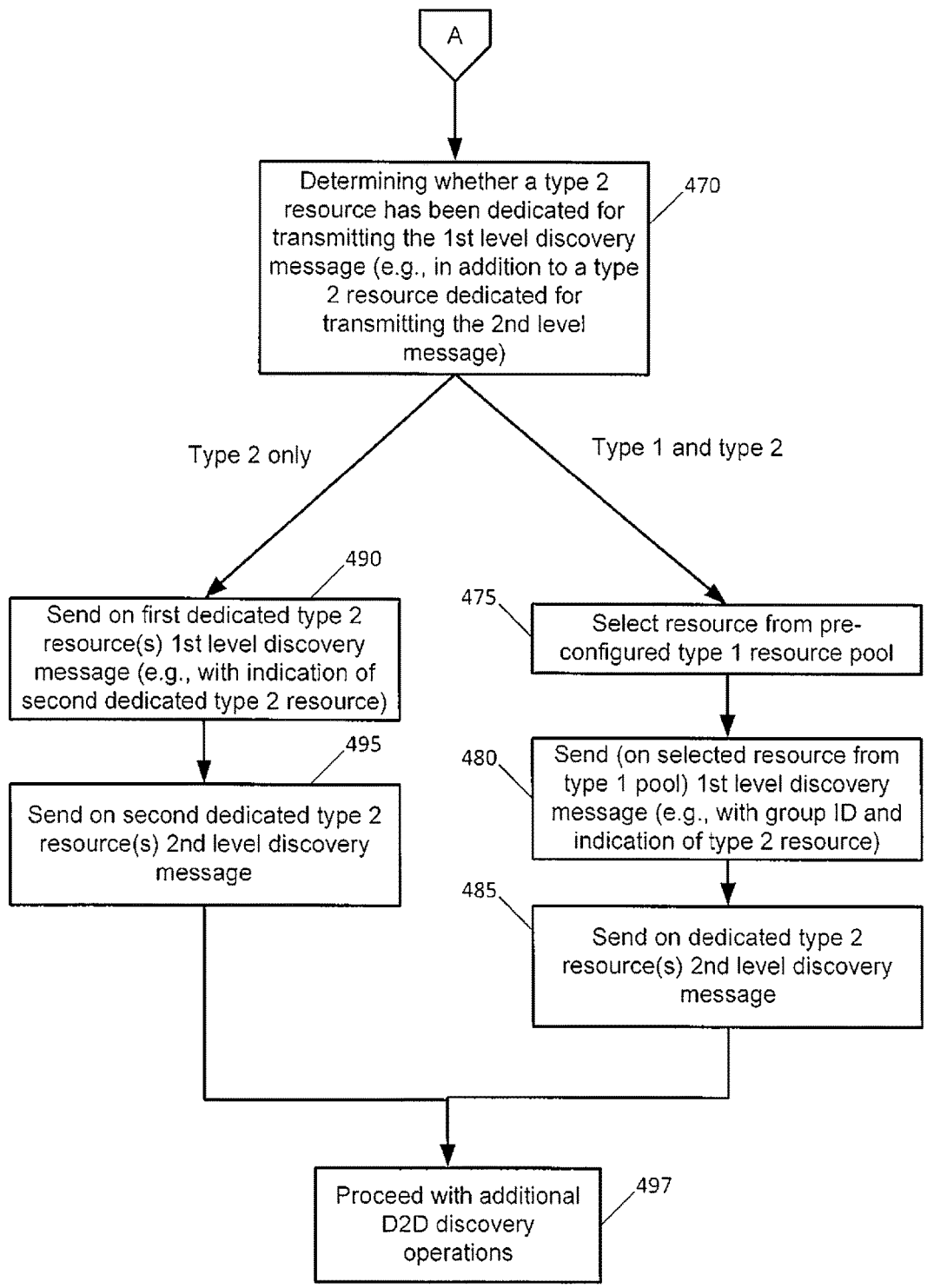

Referring to FIG. 4, including FIGS. 4A and 4B, this figure is a block diagram of an exemplary logic flow diagram performed by a discoverable user equipment for adaptive D2D discovery operation. This figure further illustrates the operation of an exemplary method, a result of execution of computer program instructions embodied on a computer readable memory, and/or functions performed by logic implemented in hardware, in accordance with exemplary embodiments herein. The blocks in FIG. 4 may be considered to be interconnected means for performing the functions in the blocks. The discoverable (also called the announcing) UE 110-1 performs the blocks in FIG. 4, e.g., under control of the adaptive D2D module 123-1. The UE 110-1 announces itself to other discovering (also called monitoring) UEs 110-2 that are in proximity of the UE 110-1.

In block 410, the UE 110-1 receives from the eNB advertisement of hierarchical D2D discovery. As described above, this advertisement could be explicit (block 415) in that a received single bit indicates whether or not hierarchical D2D discovery is supported. Alternatively, the advertisement could be implicit (block 420) in that the UE 110-1 receives support for type 2 discovery but does not receive advertisement of type 2 resource pool. The UE 110-1 can determine therefore the hierarchical D2D discovery. In block 425, the UE 110-1 receives from the eNB 190 an advertisement of the type 1 resource pool (see, e.g., reference 210 in FIG. 2). In block 430, the UE 110-1 receives from the eNB 190 advertisement of a type 2 resource pool (e.g., if mandatory or recommended if not mandatory), as described previously.

In block 435, the UE 110-1 determines whether there is a need for more flexible discovery. For instance (block 435-1), the UE 110-1 could determine that the intended discovery message cannot fit into one discovery message that is pre-defined for a discovery message transmission on a type 1 or type 2 resource. As another example (block 435-2), the UE 110-1 could determine that the type 1 resource is not sufficient to serve the intended discovery service. The UE 110-1 could consider the type 1 resource not sufficient based on a detected collision rate of discovery messages on the type 1 resource (e.g., such collision rate being higher than a threshold).

If there is no need for more flexible discovery (block 440=No), then only a single first level discovery message need be used. Note that either the type 1 resource pool or type 2 resource pool may be used for the first level discovery message. Additionally, blocks 435 and 440 may be considered to determine whether only a first level discover message is to be transmitted or whether both first and second level discovery messages are to be transmitted.

In block 445, the UE 110-1 selects a resource from the type 1 (or type 2) pool. In block 450, the UE 110-1 send (on selected resource from type 1 pool) the first level discovery message (e.g., with group ID but no indication of type 2 resource). Block 450 may alternatively entail the UE 110 sending on the type 2 resource the first level discovery messages. Note that for both the type 1 and type 2 resources, the discovering UE 110-2 likely has to perform blind decoding, using the information sent by the eNB 190 in block 340. In block 455, the UE 110-1 proceeds with additional D2D discovery operations.

If there is a need for more flexible discovery (block 440=Yes), then first and second level discovery messages need to be used. In block 460, the UE 110-1 requests dedicated type 2 discovery resource(s) (e.g., as part of a type 2 discovery resource allocation procedure). In block 465, the UE 110-1 receives indication(s) of dedicated type 2 discovery resource(s) from the eNB (e.g., as part of a type 2 discovery resource allocation procedure). Blocks 460 and 465 are exemplified by reference 230 in FIG. 2.

In block 470, the UE 110-1 determines whether a type 2 resource has been dedicated for transmitting the 1st level discovery message (e.g., in addition to a type 2 resource dedicated for transmitting the 2nd level message). Note that the UE 110-1 can select a resource from a pre-configured type 1 pool of resources (e.g., as indicated by the eNB 190), but the type 2 pool of resources are controlled by the eNB 190 and the eNB 190 will dedicate (e.g., allocate) resources to the UE 110-1 for the type 2 pool of resources. If the UE 110-1 determines both type 1 and type 2 resources are to be used for the first and second level discovery messages, in block 475, the UE 110-1 selects a resource from preconfigured type resource 1 pool and in block 480, the UE 110-1 sends (on the selected resource from the pre-configured type resource pool) the first level discovery message (e.g., with group ID and indication of a type 2 resource to be used for the second level discovery message). An example of block 480 is shown in reference 240 of FIG. 2. In block 485, the UE 110-1 sends on dedicated type 2 resource(s) the second level discovery message. The dedicated type 2 resources were allocated by the eNB and indication(s) of the dedicated type 2 resource(s) were received by the UE 110-1 (received in block 430).

If the UE 110-1 determines that only type 2 resources will be used for sending the first and second discovery messages, the UE 110-1 sends (block 490) on first dedicated type 2 resource(s) the first level discovery message. The UE 110-1 may send the first level discovery message with an indication of a second dedicated type 2 resource. The UE 110-1 sends (block 495) on the second dedicated type 2 resource(s) the second level discovery message. The UE 110-1 in this example would have had to reserve multiple type 2 resources in block 460. In an exemplary embodiment, the UE 110-1 performs one set of requests from the eNB (e.g., performed as part of a single type 2 discovery resource allocation procedure as illustrated by reference 230 of FIG. 2). In another exemplary embodiment, the UE could perform multiple requests at different times (e.g., performed as part of multiple type 2 discovery resource allocation procedures). Both these examples are possible implementations, but the latter (multiple requests) may be more signaling efficient.

Both blocks 485 and 495 proceed to block 497. In block 494, the UE 110-1 proceeds with additional D2D discovery operations.

Figure 5A:
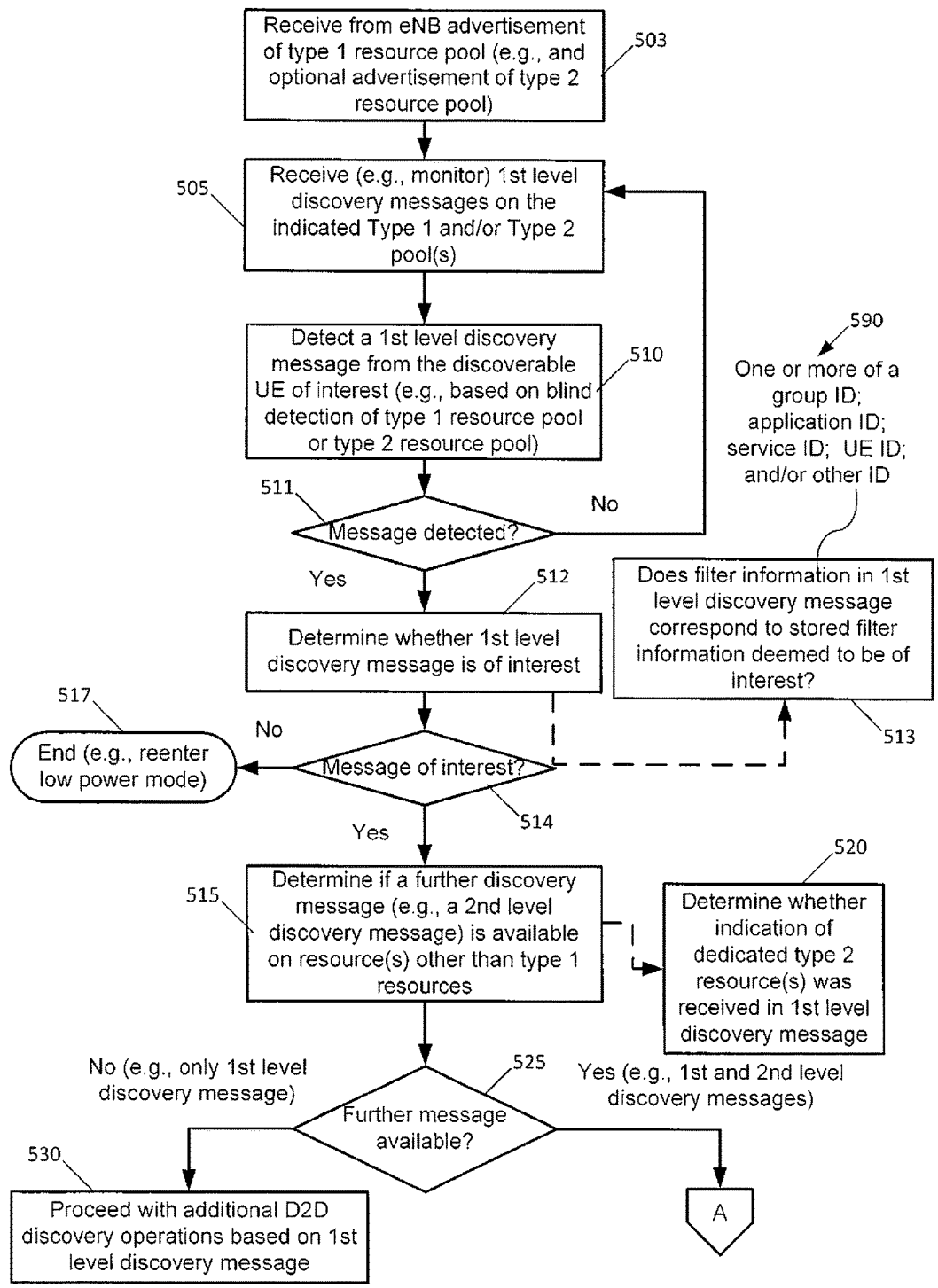
FIGS. 5A and 5B, is a block diagram of an exemplary logic flow diagram performed by a discovering user equipment for adaptive D2D discovery operation, and that illustrates the operation of an exemplary method, a result of execution of computer program instructions embodied on a computer readable memory, and/or functions performed by logic implemented in hardware, in accordance with exemplary embodiments herein.
Figure 5B:
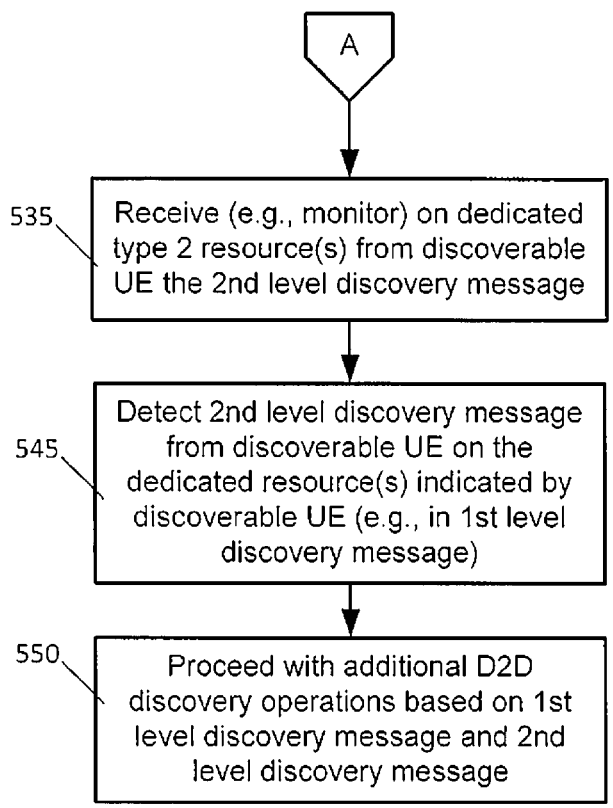

With reference to FIG. 5, including FIGS. 5A and 5B, this figure is a block diagram of an exemplary logic flow diagram performed by a discovering user equipment for adaptive D2D discovery operation. FIG. 5 illustrates the operation of an exemplary method, a result of execution of computer program instructions embodied on a computer readable memory, and/or functions performed by logic implemented in hardware, in accordance with exemplary embodiments herein. The blocks in FIG. 5 may be considered to be interconnected means for performing the functions in the blocks. The discovering (also called the monitoring) UE 110-2 performs the blocks in FIG. 5, e.g., under control of the adaptive D2D module 123-2. The UE 110-2 monitors resources on type 1 (and/or type 2) resource pools to find a discoverable (also called announcing) UE 110-1 that is in proximity to the UE 110-2. Note that in FIG. 5, it is assumed the UE 110-2 finds the UE 110-1 as being of interest and therefore proceeds with finding and decoding both first and second level discovery messages (as compared to only finding and decoding the first level discovery message, determining the UE 110-1 is not of interest, and then never finding or decoding the second level discovery message).

The UE 110-2 in block 503 receives from the eNB 190 advertisement of a type 1 resource pool. As explained above, it is also possible the UE 110-2 receives optional advertisement of a type 2 resource pool. In block 505, the UE 110-2 receives (e.g., monitors) 1st level discovery messages on the indicated Type 1 and/or Type 2 pool(s). An indication of a type 2 resource, if present, is an indication of the dedicated type 2 resource to be used by the UE 110-1 in a subsequent transmission. In block 510, the UE 110-2 detects a 1st level discovery message from the discoverable UE 110-1 The detection may be based on blind detection of type 1 resource pool (e.g., or based on blind detection of a type 2 resource pool). As described above, there could be only a first level discovery message transmitted from the UE 110-1 using one of a resource from the type 1 resource pool or a resource from the type 2 resource pool.

In block 511, if there is a message detected for type 1 or type 2 resources (block 511=Yes), the flow proceeds to block 512. In block 512, the UE 110-2 determines whether the first level discovery message is of interest. One technique for determining whether the first level discovery message is of interest is shown in block 513 where it is determined whether filter information in the first discovery message corresponds to stored filter information in UE 110-2 that is deemed to be of interest. If there is a correspondence (e.g., a match), then the UE 110-2 determines the first level discovery message to be of interest. The filter information 590 may include one or more of the following: one or more of a group ID; application ID; service ID; UE ID; and/or other ID. As described above, the group ID indicates a D2D discovery group to which the discoverable UE belongs; the application ID indicates a D2D enabled application that the discoverable UE is using; the service ID indicates a D2D based service that discoverable UE can provide; the UE ID identifies the discoverable UE; and another ID covers other situations. If the UE 110-2 determines the first level discovery message is not of interest (block 514=No), in block 517, the flow ends. For instance, the UE 110-2 may reenter low power mode.

If the UE 110-2 determines the first level discovery message is of interest (block 514=Yes), the flow proceeds to block 515, where the UE 110-2 determines if a further discovery message (e.g., a second level discovery message) is available on resource(s) other than type 1 resources. An example of block 515 is block 520, where the UE 110-2 determines whether indication of dedicated type 2 resource(s) was received in 1st level discovery message. If a further discovery message is not available (block 525=No, such that there is only a first level discovery message), the flow proceeds to block 530, where the UE 110-2 proceeds with additional D2D discovery operations based on the first level discovery message.

If a further message is available (block 525=Yes, such that there are first and second discovery messages), the flow proceeds to block 535. In block 535, the discovering UE 110-2 receives on dedicated type 2 resource(s) from the discoverable UE 110-1 the second level discovery message. The dedicated type 2 resource(s) is/are the resource(s) indicated by the UE 110-1 in block 510. In block 545, the discovering UE 110-2 detects the second level discovery message from the discoverable UE on the dedicated resource(s) indicated by discoverable UE. In block 550, the UE 110-2 proceeds with additional D2D discovery operations based on the first level discovery message and the second level discovery message.

Thus, FIG. 5 allows a single first level message to be received on either type 1 or type 2 resources, or allows first and second level messages to be received on type 1 and type 2 resources or only on type 2 resources.

A number of examples are as follows. Example 1. A method, comprising: determining first and second level discovery messages for device-to-device discovery are to be transmitted; requesting one or more resources for transmission of at least the second level discovery message and receiving one or more allocated resources of a second type; transmitting the first level discovery message on either a selected resource from a preconfigured resource pool of the first type or a selected one of the one or more allocated resources of the second type; and transmitting the second level discovery message on a selected one of the one or more allocated resources of the second type.

Example 2. The method of example 1, wherein the first level discovery message is transmitted on the selected one of the one or more allocated resources of the second type, and wherein each of the selected resource used to transmit the first level discovery message and the selected resource used to transmit the second level discovery message is a same resource of the second type.

Example 3. The method of example 1, wherein the first level discovery message is transmitted on the selected one of the one or more allocated resources of the second type, and wherein the selected resource used to transmit the first level discovery message and the selected resource used to transmit the second level discovery message are different resources of the second type.

Example 4. The method of any of examples 1 to 3, wherein the first level discovery message is transmitted on the selected one of the one or more allocated resources of the second type, wherein the method is performed by a user equipment and wherein the selected resource used to transmit the first level discovery message and the selected resource used to transmit the second level discovery message are indicated to the user equipment by a base station.

Example 5. The method of example 1, wherein the first level discovery message is transmitted on the selected resource of the first type.

Example 6. The method of example 5, wherein the first level discovery message is transmitted on the selected resources of the first type whenever the second level discovery message is determined to be needed, a base station does not allocate a resource of the second type for transmission of the first level discovery message, or both whenever the second level discovery message is determined to be needed and the base station does not allocate a resource of the second type for transmission of the first level discovery message.

Example 7. The method of any of examples 1 to 5, wherein determining first and second level discovery messages for device-to-device discovery are to be transmitted further comprises: receiving an advertisement of resources of the first type and of the second type for the first level discovery message; determining there is a need for more flexible discovery than provided by the first level discovery message or by an advertised resource, wherein the requesting the one or more resources for transmission of at least the second level discovery message is performed in response to determining there is a need for more flexible discovery.

Example 8. The method of example 7, wherein determining there is a need for more flexible discovery than provided by the first level discovery message or by the advertised resource further comprises: determining an intended discovery message cannot fit into one discovery message that is pre-defined for a discovery message transmission on the resource of the first type or the second type.

Example 9. The method of example 7, wherein determining there is a need for more flexible discovery than provided by the first level discovery message or by the advertised resource further comprises: determining that a resource of the first type is not sufficient to serve an intended discovery service.

Example 10. The method of any of examples 1 to 9, wherein the first level discovery message comprises an indication of the selected allocated resource of the second type to be used for transmitting the second level discovery message.

Example 11. A method, comprising: receiving a first level discovery message for device-to-device communications on either a resource of a first type or a resource of a second type; determining whether the received first level discovery message is of interest or not and in response to the first level discovery message being of interest, then determining whether a second level discovery message corresponding to the first level discovery message is available and receiving, in response to a determination the second level discovery message is available, the second level discovery message on a resource of the second type.

Example 12. The method of example 11, wherein the first level discovery message is received on the resource of the second type, and wherein each of the resources used to receive the first level discovery message and the resource used to receive the second level discovery message is a same resource of the second type.

Example 13. The method of example 11, wherein the first level discovery message is received on the resource of the second type, and wherein the resource used to receive the first level discovery message and the resource used to receive the second level discovery message are different resources of the second type.

Example 14. The method of example 11, wherein the first level discovery message is received on the resource of the first type.

Example 15. The method of any of examples 11 to 14, wherein determining whether the received first level discovery message is of interest or not further comprises determining whether filter information in the first level discovery message corresponds to stored filter information deemed to be of interest.

Example 16. The method of any of examples 11 to 15, wherein the first level discovery message comprises filter information and wherein the filter information comprises one or more of a group identification; an application identification; a service identification; a user equipment identification; or other identification.

Example 17. The method of any of examples 11 to 16, wherein: the method further comprises receiving from a base station advertisement of a resource pool for the first type and a resource pool for the second type; receiving the first level discovery message further comprises performing blind detection of messages, if any, in the resource pool for the first type and in the resource pool for the second type in order to receive the first level discovery message.

Example 18. The method of any of examples 11 to 17, wherein determining whether a second level discovery message corresponding to the first level discovery message is available further comprises determining whether an indication of a resource of the second type was received in first level discovery message and in response to the indication being received, determining the second level discovery message is available.

Example 19. An apparatus, comprising: means for determining first and second level discovery messages for device-to-device discovery are to be transmitted; means for requesting one or more resources for transmission of at least the second level discovery message and receiving one or more allocated resources of a second type; means for transmitting the first level discovery message on either a selected resource from a preconfigured resource pool of the first type or a selected one of the one or more allocated resources of the second type; and means for transmitting the second level discovery message on a selected one of the one or more allocated resources of the second type.

Example 20. The apparatus of example 19, wherein the first level discovery message is transmitted on the selected one of the one or more allocated resources of the second type, and wherein each of the selected resource used to transmit the first level discovery message and the selected resource used to transmit the second level discovery message is a same resource of the second type.

Example 21. The apparatus of example 19, wherein the first level discovery message is transmitted on the selected one of the one or more allocated resources of the second type, and wherein the selected resource used to transmit the first level discovery message and the selected resource used to transmit the second level discovery message are different resources of the second type.

Example 22. The apparatus of any of examples 19 to 21, wherein the first level discovery message is transmitted on the selected one of the one or more allocated resources of the second type, wherein the apparatus comprises a user equipment and wherein the selected resource used to transmit the first level discovery message and the selected resource used to transmit the second level discovery message are indicated to the user equipment by a base station.

Example 23. The apparatus of example 19, wherein the first level discovery message is transmitted on the selected resource of the first type.

Example 24. The apparatus of example 23, wherein the first level discovery message is transmitted on the selected resources of the first type whenever the second level discovery message is determined to be needed, a base station does not allocate a resource of the second type for transmission of the first level discovery message, or both whenever the second level discovery message is determined to be needed and the base station does not allocate a resource of the second type for transmission of the first level discovery message.

Example 25. The apparatus of any of examples 19 to 24, wherein the means for determining first and second level discovery messages for device-to-device discovery are to be transmitted further comprises: means for receiving an advertisement of resources of the first type and of the second type for the first level discovery message; means for determining there is a need for more flexible discovery than provided by the first level discovery message or by the advertised resource, wherein the requesting the one or more resources for transmission of at least the second level discovery message is performed in response to determining there is a need for more flexible discovery.

Example 26. The apparatus of example 26, wherein the means for determining there is a need for more flexible discovery than provided by the first level discovery message or by the advertised resource further comprises: means for determining an intended discovery message cannot fit into one discovery message that is pre-defined for a discovery message transmission on the resource of the first type or the second type.

Example 27. The apparatus of example 26, wherein the means for determining there is a need for more flexible discovery than provided by the first level discovery message or by the advertised resource further comprises: means for determining that a resource of the first type is not sufficient to serve an intended discovery service.

Example 28. The apparatus of any of examples 19 to 27, wherein the first level discovery message comprises an indication of the selected allocated resource of the second type to be used for transmitting the second level discovery message.

Example 29. An apparatus, comprising: means for receiving a first level discovery message for device-to-device communications on either a resource of a first type or a resource of a second type; and means for determining whether the received first level discovery message is of interest or not and in response to the first level discovery message being of interest, then using means for determining whether a second level discovery message corresponding to the first level discovery message is available and means for receiving, in response to a determination the second level discovery message is available, the second level discovery message on a resource of the second type.

Example 30. The apparatus of example 29, wherein the first level discovery message is received on the resource of the second type, and wherein each of the resource used to receive the first level discovery message and the resource used to receive the second level discovery message is a same resource of the second type.

Example 31. The apparatus of example 29, wherein the first level discovery message is received on the resource of the second type, and wherein the resource used to receive the first level discovery message and the resource used to receive the second level discovery message are different resources of the second type.

Example 32. The apparatus of example 29, wherein the first level discovery message is received on the resource of the first type.

Example 33. The apparatus of any of examples 29 to 32, wherein the means for determining whether the received first level discovery message is of interest or not further comprises means for determining whether filter information in the first level discovery message corresponds to stored filter information deemed to be of interest.

Example 34. The apparatus of any of examples 29 to 33, wherein the first level discovery message comprises filter information and wherein the filter information comprises one or more of a group identification; an application identification; a service identification; a user equipment identification; or other identification.

Example 35. The apparatus of any of examples 29 to 34, wherein: the apparatus further comprises means for receiving from a base station advertisement a resource pool for the first type and a resource pool for the second type; the means for receiving the first level discovery message further comprises means for performing blind detection of messages, if any, in the resource pool for the first type and in the resource pool for the second type in order to receive the first level discovery message.

Example 36. The apparatus of any of examples 29 to 35, wherein determining whether a second level discovery message corresponding to the first level discovery message is available further comprises determining whether an indication of the resource of the second type was received in first level discovery message and in response to the indication being received, determining the second level discovery message is available.

Example 37. A system comprising a first apparatus of examples 19 to 28 and a second apparatus of examples 29 to 36.

Example 38. The system of example 37, further comprising a base station, wherein the base station allocates at least one or more resources of the second type for use by the two apparatus for device-to-device discovery and communicates indication of the allocated one or more resources to at least the first apparatus.

Example 39. A computer program comprising program code for executing the method according to any of examples 1 to 18.

Example 40. The computer program according to example 39, wherein the computer program is a computer program product comprising a computer-readable medium bearing computer program code embodied therein for use with a computer.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memory(ies) 125, 155 or other device) that may be any media or means that can contain or store the instructions for use by or in connection with an instruction execution system, apparatus, or device, such as a computer. A computer readable storage medium does not, however, encompass propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

| | |
|---|---|
| 1st | first |
| 2nd | second |
| 3GPP | Third generation partnership project |
| BCCH | Broadcast Control CHannel |
| D2D | Device-to-Device |
| DCI | Downlink Control Information |
| eNB | evolved NodeB (e.g., LTE base station) |
| ID | Identifier |
| LTE | Long term evolution |
| MME | Mobility Management Entity |
| ProSe | Proximity Service or Proximity-based Service |
| QoS | Quality of Service |
| RAN | Radio Access Network |
| RAN2 | RAN WG2 |
| Rel | Release |
| RRC | Radio Resource Control |
| Rx | Reception or Receiver |
| SFN | System Frame Number |
| SGW | Serving gateway |
| TR | Technical Report |
| Tx | Transmission or Transmitter |
| UE | User equipment (e.g., a wireless, mobile device) |
| WG | Working Group |

What is claimed is:

1. A method, comprising:
   determining first and second level discovery messages for device-to-device discovery are to be transmitted;
   requesting one or more resources for transmission of at least the second level discovery message and receiving an indication of one or more allocated resources of a second type;
   determining if at least one of the one or more allocated resources of the second type is dedicated for transmitting the first level discovery message;
   transmitting the first level discovery message on a selected resource from a preconfigured resource pool of a first type in response to a determination that the at least one of the one or more allocated resources of the second type is non-dedicated with respect to the first level discovery message;
   transmitting the first level discovery message on a first selected one of the one or more allocated resources of the second type in response to a determination that the at least one of the one or more allocated resources of the second type is dedicated with respect to the first level discovery message; and
   transmitting the second level discovery message on a second selected one of the one or more allocated resources of the second type.

2. The method of claim 1, wherein the first level discovery message is transmitted on the first selected one of the one or more allocated resources of the second type, and wherein each of the first selected resource used to transmit the first level discovery message and the second selected resource used to transmit the second level discovery message is a same resource of the second type.

3. The method of claim 1, wherein the first level discovery message is transmitted on the first selected one of the one or more allocated resources of the second type, and wherein the first selected resource used to transmit the first level discovery message and the second selected resource used to transmit the second level discovery message are different resources of the second type.

4. The method of claim 1, wherein the first level discovery message is transmitted on the first selected one of the one or more allocated resources of the second type, wherein the method is performed by a user equipment and wherein the first selected resource used to transmit the first level discovery message and the second selected resource used to transmit the second level discovery message are indicated to the user equipment by a base station.

5. The method of claim 1, wherein the first level discovery message is transmitted on the selected resource of the first type.

6. The method of claim 5, wherein the first level discovery message is transmitted on the selected resource of the first type whenever the second level discovery message is determined to be needed, a base station does not allocate a resource of the second type for transmission of the first level discovery message, or both whenever the second level discovery message is determined to be needed and the base station does not allocate the resource of the second type for transmission of the first level discovery message.

7. The method of claim 1, wherein determining the first and second level discovery messages for device-to-device discovery are to be transmitted further comprises:
receiving an advertisement of resources of the first type and of the second type for the first level discovery message;
determining there is a need for more flexible discovery than provided by the first level discovery message or by an advertised resource,
wherein the requesting the one or more resources for transmission of at least the second level discovery message is performed in response to determining there is the need for more flexible discovery.

8. An apparatus, comprising:
at least one processor;
memory storing a program of instructions;
wherein the memory storing the program of instructions is configured, with the at least one processor, to cause the apparatus to at least:
determine first and second level discovery messages for device-to-device discovery are to be transmitted;
request one or more resources for transmission of at least the second level discovery message and receiving an indication of one or more allocated resources of a second type;
determine if at least one of the one or more allocated resources of the second type is dedicated for transmitting the first level discovery message;
transmit the first level discovery message on a selected resource from a preconfigured resource pool of a first type in response to a determination that the at least one of the one or more allocated resources of the second type is non-dedicated with respect to the first level discovery message;
transmit the first level discovery message on a first selected one of the one or more allocated resources of the second type in response to a determination that the at least one of the one or more allocated resources of the second type is dedicated with respect to the first level discovery message; and
transmit the second level discovery message on a second selected one of the one or more allocated resources of the second type.

9. The apparatus of claim 8, wherein the first level discovery message is transmitted on the first selected one of the one or more allocated resources of the second type, and wherein each of the first selected resource used to transmit the first level discovery message and the second selected resource used to transmit the second level discovery message is a same resource of the second type.

10. The apparatus of claim 8, wherein the first level discovery message is transmitted on the first selected one of the one or more allocated resources of the second type, and wherein the first selected resource used to transmit the first level discovery message and the second selected resource used to transmit the second level discovery message are different resources of the second type.

11. The apparatus of claim 8, wherein the first level discovery message is transmitted on the first selected one of the one or more allocated resources of the second type, wherein the apparatus comprises a user equipment and wherein the first selected resource used to transmit the first level discovery message and the second selected resource used to transmit the second level discovery message are indicated to the user equipment by a base station.

12. The apparatus of claim 8, wherein the first level discovery message is transmitted on the selected resource of the first type.

13. The apparatus of claim 12, wherein the first level discovery message is transmitted on the selected resource of the first type whenever the second level discovery message is determined to be needed, a base station does not allocate a resource of the second type for transmission of the first level discovery message, or both whenever the second level discovery message is determined to be needed and the base station does not allocate the resource of the second type for transmission of the first level discovery message.

14. The apparatus of claim 8, further configured to at least:
receive an advertisement of resources of the first type and of the second type for the first level discovery message;
determine there is a need for more flexible discovery than provided by the first level discovery message or by the advertised resource,
wherein the requesting the one or more resources for transmission of at least the second level discovery message is performed in response to determining there is the need for more flexible discovery.

* * * * *